May 30, 1933.  H. A. DOUGLAS  1,911,611
SIGNALING SYSTEM FOR AUTOMOTIVE VEHICLES
Original Filed May 16, 1929   2 Sheets-Sheet 1
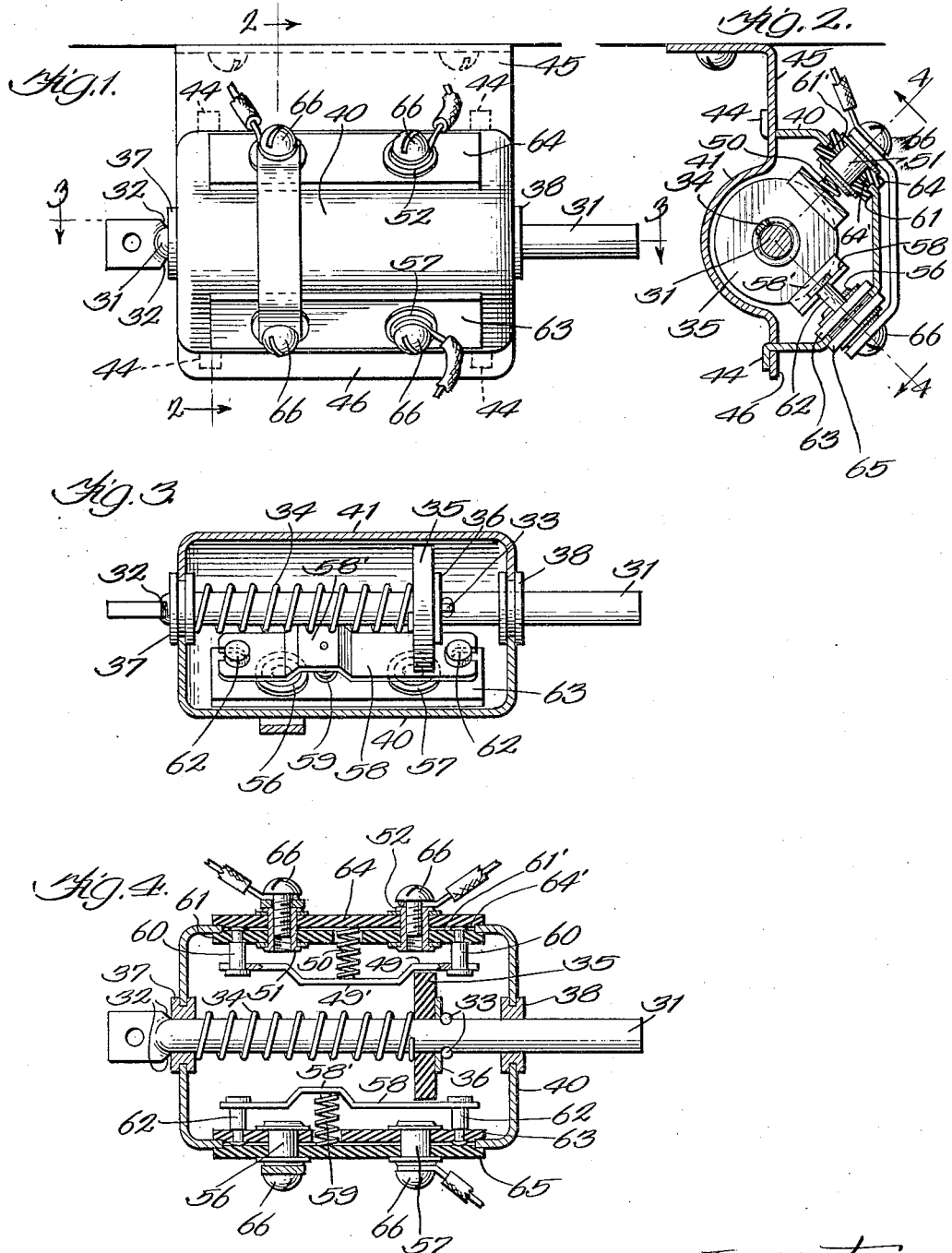
Inventor:
Harry A. Douglas May 30, 1933.  H. A. DOUGLAS  1,911,611
SIGNALING SYSTEM FOR AUTOMOTIVE VEHICLES
Original Filed May 16, 1929   2 Sheets-Sheet 2
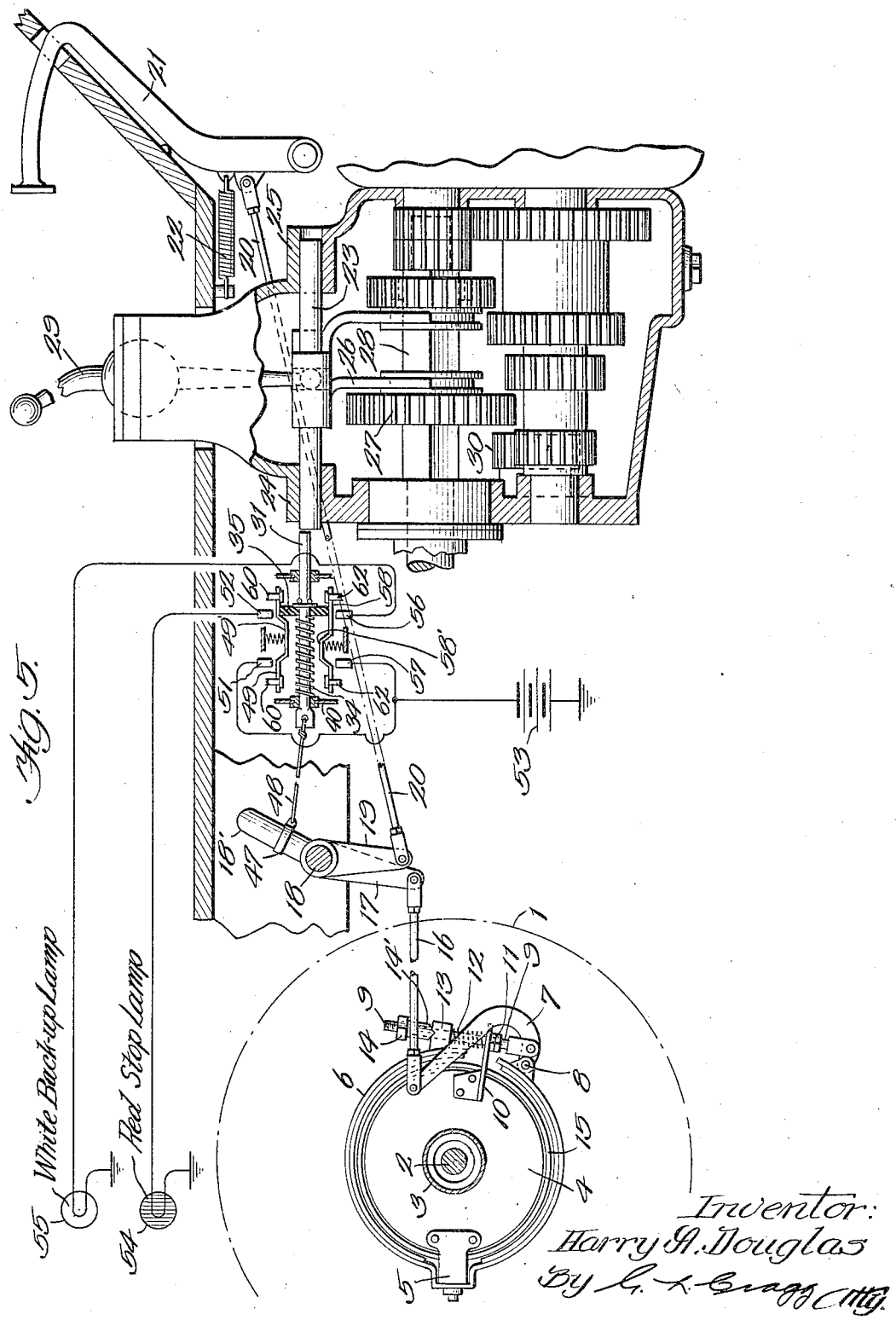
Inventor:
Harry A. Douglas
By G. L. Cragg Atty.

Patented May 30, 1933

1,911,611

UNITED STATES PATENT OFFICE

HARRY A. DOUGLAS, OF BRONSON, MICHIGAN

SIGNALING SYSTEM FOR AUTOMOTIVE VEHICLES

Original application filed May 16, 1929, Serial No. 363,680. Divided and this application filed May 19, 1930. Serial No. 453,504.

My invention relates to signaling systems for automotive vehicles and resides in the provision of switching mechanism whose actuating means is operable by the brake applying mechanism and the mechanism effecting reverse or backward movement of an automotive vehicle. This actuating means has one range of operation when it is operated by the brake applying mechanism, to effect the display of a stop signal such as an incandescent lamp, and another range of operation when it is operated by the mechanism that effects the backward or reverse travel of the vehicle to operate a back up signal. The ranges of operation are desirably of different extent and in lapping relation, whereby the switching mechanism may be made as compact as desirable. The actuating member is desirably inclusive of a rod which is pulled upon by one of the aforesaid automotive vehicle controlling mechanisms and pushed upon by the other. This rod moves throughout one range to govern one set of switch contacts in one of the signaling circuits and another range to govern the set of contacts that pertain to the other signaling circuit.

A large percentage of the automobiles now produced employ in addition to the red tail light, a colored stop light controlled by the brake pedal and a white back-up light controlled by the reversing mechanism. My invention, among other objects, effects novel provision for illuminating the stop light whether the braking mechanism or the reversing mechanism be actuated. Thus when the driver of the vehicle intends to back up, he may have the colored stop light illuminated as a warning to those behind him that he is not moving forward and at the same time he may have the white back-up light illuminated to provide vision in backing up. The white light would not give the necessary warning which a colored light gives and a colored light would not provide the vision which a white light does. The colored light alone is a stop signal, whereas the combination of the colored light and the white light acts as a back-up signal in addition to providing for vision. Furthermore, the white light alone is also a signal since the car is usually equipped with a red tail light in addition to the colored stop light and the combination of the red tail light and white back-up light acts as a back-up signal.

The invention will be more fully explained in connection with the accompanying drawings in which Fig. 1 is a side elevation of a preferred switch structure; Fig. 2 is a sectional view on line 2—2 of Fig. 1; Fig. 3 is a sectional view on line 3—3 of Fig. 1; Fig. 4 is a sectional view on line 4—4 of Fig. 3; and Fig. 5 is a view somewhat diagrammatic illustrating a braking and reversing mechanism of an automotive vehicle in operating relation with my switching mechanism, the signal circuits governed by the switching mechanism being also diagrammatically indicated.

The automotive vehicle mechanism illustrated is provided with vehicle wheels. One of these wheels, indicated at 1, is one of the rear driving wheels which is carried upon one section 2 of the driving shaft, these shaft sections being coupled by differential gearing as is well understood. This driving shaft, having the differentially coupled sections 2, is enclosed by a stationary housing indicated at 3. A stationary disc 4 is mounted upon each end of the housing, each driving wheel having such a disc at its inner side. Each disc carries a stationary bracket 5 and each bracket carries a brake band 6, in the form of a split collar, the bracket being secured to the collar near the mid-portion thereof. A lever 7 is pivoted, at one end, to and near one end of each collar, such a point of pivotal connection being indicated at 8. A rod 9 has one end in pivotal connection with each lever 7 and near the pivot 8 of such lever. This rod passes through a bracket 10 upon the corresponding disc 4. Nuts 11 upon each rod engage the underside of the corresponding bracket 10. A coiled spring 12 surrounds each rod 9 and is interposed between the top side of the corresponding bracket 10 and a lug 13 that is provided upon the corresponding brake band 6 and at the other end of this brake band opposite the pivot 8. A nut 14 is screwed upon the upper end of each rod 9, this nut having a continuation 14' which bears upon the top side of the corresponding lug 13. When the upper end of the lever 7 is pulled to the right, the brake band 6 is contracted to engage the brake drum 15 surrounding the corresponding disc 4. Each brake lever 7 has its upper end connected by a link 16 with an arm 17 which is fixed upon a brake rod 18 that extends between both braking mechanisms pertaining the vehicle wheels 1. Another arm 19 is also fixed upon the brake rod 18. This latter arm is connected by a link 20 with an intermediate portion of the pedal lever 21. Each time said pedal lever is depressed it moves in a clockwise direction and pulls the link 20 to the right to cause a partial rotation of the rod 18 in a counter-clockwise direction. Said rod, in thus turning, moves both arms 17 in a counterclockwise direction. These arms turn the brake levers 7 in a clockwise direction to contract the brake bands 6 and frictionally engage these bands with the corresponding brake drums 15. When the pedal lever 21 is released the spring 22 serves to restore it by turning it in a counter-clockwise direction, whereby the brakes are released. When the brakes are released the springs 12 take part in opening the brake bands. This braking mechanism is well known and has only been described, to some extent, because of its interrelation with my switching mechanism.

The gear shifting mechanism illustrated is also well known. It will suffice to mention the portions thereof which are concerned in reversing the direction of travel of the automotive vehicle, at which time the switching mechanism of my invention is also brought into play. A yoke rod 23 is disposed in guideways 24, 25 which are provided in the gear casing. The yoke 26 which is carried by the yoke carrying rod 23 is received within an annular groove provided in the hub of the spur gear 27. This spur gear has a square hole through its central or hub portion which snugly receives the square shaft 28 which turns in a fixed plane and along which the gear 27 may slide. When the shift lever 29 is properly placed in a forward position the spur gear 27 is moved rearwardly into mesh with the spur pinion 30 which is so driven by the engine as to effect a reversal in the normal direction of rotation of the shaft 28, whereby the shaft sections 2 have their normal direction of rotation reversed to cause the vehicle to move backwardly.

I will next describe the preferred form of switch mechanism and thereafter set forth its interrelation with the braking and reversing mechanism.

The switch contact actuating member includes a reciprocable rod 31 made preferably of iron or steel. Two abutments or sets of abutments 32 and 33 are desirably integrally formed with the rod and are spaced apart longitudinally of the rod. A coiled spring 34 surrounds the rod and is disposed between said abutments. A switch controlling collar 35, formed preferably of insulation, is slipped upon one end of the rod, together with a washer 36, before the abutments on this end of the rod are formed, said washer being interposed between said collar and the abutments 33, said collar being disposed between the abutments 32 and 33 and between one end of the spring 34 and the abutments 33. A bearing sleeve 37 surrounds and is in sliding relation to the rod 31 and is interposed between the abutments 32 and the other end of the spring 34, this bearing sleeve 37 being consequently interposed between the abutments 32 on one end of the rod and the abutments 33 on the other end of the rod. The spring 34 is compressed between the bearing sleeve 37 and the collar 35 whereby the collar 35 and washer 36 are pressed against the abutments 33 and the abutments 32 are pressed against the sleeve 37. A second bearing sleeve 38 also surrounds and is in sliding relation to the rod, the abutments 33 being between the collar 35 and this second bearing sleeve 38.

The switch carrier or casing is made in two sections, one a cap section 40 and the other a mounting section 41, the two casing sections meeting upon a plane that contains the axis of the rod when the rod is assembled with the casing. The end walls of the casing sections 40 and 41 are formed with circular openings through which rod 31 passes and which are complete when the casing sections are assembled.

As illustrated, the casing section 40 is formed with ears 44 that are passed through openings formed in the wings 45 and 46 that project from the longitudinal margins of the casing section 41, these ears being thereafter turned into clinching engagement with said wings. The end walls of the casing firmly hold bearing sleeves 37 and 38 in fixed relation so that the rod 31 may be moved against the force of the spring 34.

The rod is pulled upon when the pedal lever 21 is turned clockwise to apply the brake. To this end the brake rod has a lateral portion 18' which is surrounded by a collar 47 that is connected with the left hand end of the rod 31 by a wire link 48. When the rod 31 is pulled upon coincidently with the application of the brakes, the insulating collar 35 rides upon a floating bar 49 and into engagement with the hump 49' upon this bar. Said bar is thus bodily moved against the force of a coiled spring 50 into engagement with the contacts 51 and 52. Said bar 49 thereupon bridges the contacts 51 and 52, and consequently, establishes a circuit which may be traced from the grounded battery 53 through contact 51, bar 49, contact 52, the stop signal incandescent lamp 54 to ground.

The rod 31 has one range of travel to cause the collar 35 thereon to establish the stop light signal circuit when the brakes are operated.

In accordance with my invention the range of movement of the rod is increased when the gear shifting mechanism is adjusted to cause the vehicle to travel backwardly. When this range of travel is thus increased by the operation of the gear shifting mechanism a back up signaling lamp circuit is established, this circuit being inclusive of a grounded incandescent lamp 55, the contacts 56 and 57, a contact bar 58 and the aforesaid battery 53. The contact bar 58 has a hump 58' which is preferably located abreast of the hump 49' but which is shorter in length. A gap normally exists between the hump 58' and the collar 35, this not being the case with respect to the hump 49'. The aforesaid gap is of such length that the hump 58' is not reached by the collar 35 when the rod 31 is pulled upon coincidently with the application of the brakes. The member 23 of the gear shifting mechanism is adapted for abutting engagement with the rod 31 at the end of this rod opposite the wire link 48. The travel of the member 23 is of such extent, when the automotive vehicle is placed in reverse, as to move the collar 35 far enough to engage the hump 58' and cause the contacting bar 58 to engage the contacts 56 and 57 against the force of a coiled spring 59. Thus the circuit of the back up lamp 55 is included in circuit each time the automotive vehicle is placed in reverse. As arranged the collar 35 also engages the hump 49' when the automotive vehicle is placed in reverse, so that the circuit of the stop light 54 is also established. Both lamps 54 and 55 thus glow when the automotive vehicle is placed in reverse and the lamp 54 alone glows when the brakes are applied. While I prefer to have both signaling devices 54 and 55 operate simultaneously on reverse, yet I do not wish to be thus limited.

The contact bars 49 and 58 desirably float. The springs 50 and 59 which respectively press upon these bars do so at or near the middle thereof and the bars are guided at their ends in bodily movement toward and from the contacts respectively pertaining thereto by means of guiding pins. The guiding pins 60 for the bar 49 are carried by a bar 61 of insulation, these guiding pins passing through deep notches in the ends of the bar 49. The guiding pins 62 for the bar 58 are carried by another bar 63 of insulation, these latter guiding pins also passing through deep notches in the ends of this bar 58. The contacts 51 and 52 are desirably in the form of interiorly threaded sleeves whose ends are upset into flanges. The bar 61 and another bar 64, of the same extent as the bar 61, are interposed between the flanges of these sleeves, the body portions of said sleeves passing snugly through registering openings that are formed in the insulating bars. A rectangular opening, of smaller dimensions than the insulating bars, is formed through the casing section 40 and the margins of this opening are clamped between these bars in the formation of the flanges or one of the flanges upon each of the sleeves 51 and 52. The bars 61 and 64 are desirably formed with reduced inner and opposed facial portions 61', 64' that are snugly received within the aforesaid opening, whereby these bars are positioned. Insulating bars 63 and 65 have an assembly with the casing and the contacts 56 and 57 which is similar to the assembly of the bars 61 and 64 with the casing and contacts 51 and 52. The various circuit wires are assembled with the aforesaid contacts by means of binding screws 66 which enter the sleeve contacts 51, 52, 56 and 57. The present application is a division of my original application Serial No. 363,680 filed May 16, 1929, which issued as Patent No. 1,846,513.

Changes may be made without departing from the invention.

Having thus described my invention, I claim:

1. The combination with braking mechanism and mechanism for reversing the direction of travel of an automotive vehicle; of two electric circuits, one inclusive of a colored stop light to be operated upon operation of the braking mechanism, and the other including a white back-up light to be operated upon operation of the reversing mechanism; and switching mechanism having an actuating member with which the braking mechanism is connected to establish the first aforesaid circuit by movement of the actuating member to one position and with which the reversing mechanism is connected to establish the second aforesaid circuit by movement of the actuating member to another position.

2. The combination with braking mechanism and mechanism for reversing the direction of travel of an automotive vehicle; of two lighting circuits, one inclusive of a colored stop light to be operated upon operation of the braking mechanism, and the other including a white back-up light to be operated upon operation of the reversing mechanism; and switching mechanism inclusive of pairs of normally open contacts pertaining to each of the aforesaid circuits and an actuating member movable to engage the contacts pertaining to each of the aforesaid circuits, said actuating member being operable through one range of movement by the braking mechanism, when this braking mechanism is operated to apply the brakes, to cause a pair of said contacts to be closed to establish the lighting circuit pertaining to the braking mechanism and through another range by the reversing mechanism when this reversing mechanism is operated to reverse the direction of travel of the vehicle to cause another pair of contacts to be closed to establish the lighting circuit pertaining to the reversing mechanism.

3. The structure of claim 2 wherein the ranges of operation of the switch actuating member are in overlapping relation and the actuating member has a portion engageable with the contacts operable thereby, said contacts having parts engaged by this portion, one of these contact parts being sufficiently removed from said actuating portion to avoid engagement with this portion when the actuating member is operating through one range, the actuating member being engageable with this spaced contact portion when such actuating member is operating through the other range.

4. The structure of claim 2 wherein the ranges of operation of the switch actuating member are in overlapping relation and the actuating member has a portion engageable with the contacts operable thereby, said contacts having parts engaged by this portion, one of these contact parts being sufficiently removed from said actuating portion to avoid engagement with this portion when the actuating member is operating through one range, the actuating member being engageable with this spaced contact portion when such actuating member is operating through the other range and wherein said actuating member portion is engageable with both contacts operable thereby when this actuating member operates through this latter range.

5. The structure of claim 2 wherein the actuating member is inclusive of a reciprocable rod which is movable in one direction to effect control of both circuits, one of the first two mentioned mechanisms being in pushing relation with the said rod and to operate the switch when this mechanism is operated for its purpose and the other of the first two mentioned mechanisms being in pulling relation with the said rod to operate the switch when this latter mechanism is operated for its purpose, the extents of movement of the rod effected by these two mechanisms being unequal and the contact that pertains to one of the circuits having a part operable by the rod which is positioned to be actuated by the rod in its greater range of movement and to be free of such operation in the lesser range of movement of the rod.

6. The structure of claim 2 wherein the actuating member is inclusive of a reciprocable rod which is movable in one direction to effect control of both circuits, one of the first two mentioned mechanisms being in pushing relation with the said rod and to operate the switch when this mechanism is operated for its purpose and the other of the first two mentioned mechanisms being in pulling relation with the said rod to operate the switch when this latter mechanism is operated for its purpose, the extents of movement of the rod effected by these two mechanisms being unequal and the contact that pertains to one of the circuits having a part operable by the rod which is positioned to be actuated by the rod in its greater range of movement and to be free of such operation in the lesser range of movement of the rod and wherein the actuating rod is engageable with both of the contacts operable thereby when the actuating rod moves throughout its greater range.

7. In a signaling system for an automotive vehicle, the combination with braking mechanism and mechanism for reversing the direction of travel of the vehicle; of two electric circuits, one inclusive of a colored stop light and the other inclusive of a white backup light; and switching mechanism having an actuating member common to both circuits with which the braking mechanism is connected to move said member to one position to establish the stop light circuit and with which the reversing mechanism is connected to move the said member to another position to establish both circuits.

In witness whereof, I hereunto subscribe my name.

HARRY A. DOUGLAS.